United States Patent [19]

Smith

[11] Patent Number: 5,065,897
[45] Date of Patent: Nov. 19, 1991

[54] UNIVERSAL DISPENSING APPARATUS FOR STACKED ARTICLES

[76] Inventor: Robert D. Smith, 209 Rustic Dr., North Huntingdon, Pa. 15642

[21] Appl. No.: 603,239

[22] Filed: Oct. 25, 1990

[51] Int. Cl.⁵ .............................................. B65G 59/00
[52] U.S. Cl. ..................................... 221/130; 221/133; 221/195; 221/287; 221/270; 221/276; 221/131
[58] Field of Search ........................... 221/92, 123-126, 221/129-131, 133, 195, 197, 208, 224, 258, 261-262, 268, 270, 276, 287; 414/267-268, 417, 797.9

[56] References Cited

U.S. PATENT DOCUMENTS

| | | | |
|---|---|---|---|
| 3,010,556 | 11/1961 | Wawrzonek et al. | 221/125 |
| 3,185,281 | 5/1965 | Gross | 221/129 |
| 3,228,553 | 11/1966 | Breitenstein et al. | 221/197 |
| 3,893,589 | 7/1975 | Mandell | 211/123 |
| 4,000,821 | 1/1977 | Naito et al. | 414/797.9 |
| 4,681,241 | 7/1987 | Olofsson et al. | 221/124 |
| 4,921,128 | 5/1990 | Guigan et al. | 414/797.9 |

*Primary Examiner*—H. Grant Skaggs
*Attorney, Agent, or Firm*—Larson and Taylor

[57] ABSTRACT

A dispensing device is provided for dispensing a plurality of articles such as cigarette boxes. The device includes two levels of individual dispensing modules. Each dispensing module includes a plurality of vertical stack holders mounted on a support plate having an open center. A dispensing mechanism selectively withdraws an article from one of the stack holders and conveys the article to the open center such that the article drops through the open center for conveyance to a final destination. The dispensing mechanism includes a shuttle plate also having an open center and a mechanism for moving the shuttle plate beneath the support plate for the vertical stack holders. One or more solenoid-activated engagement pins on the shuttle plate selectively engage one or more of the articles held in the stack holders such that, as the shuttle plate moves, the engaged article or articles moves with the shuttle plate. The individual modules are arranged in two levels such that the open centers of top and bottom level modules are aligned to thereby allow articles dispensed from top level modules to fall through the open center of a corresponding bottom level module.

12 Claims, 3 Drawing Sheets

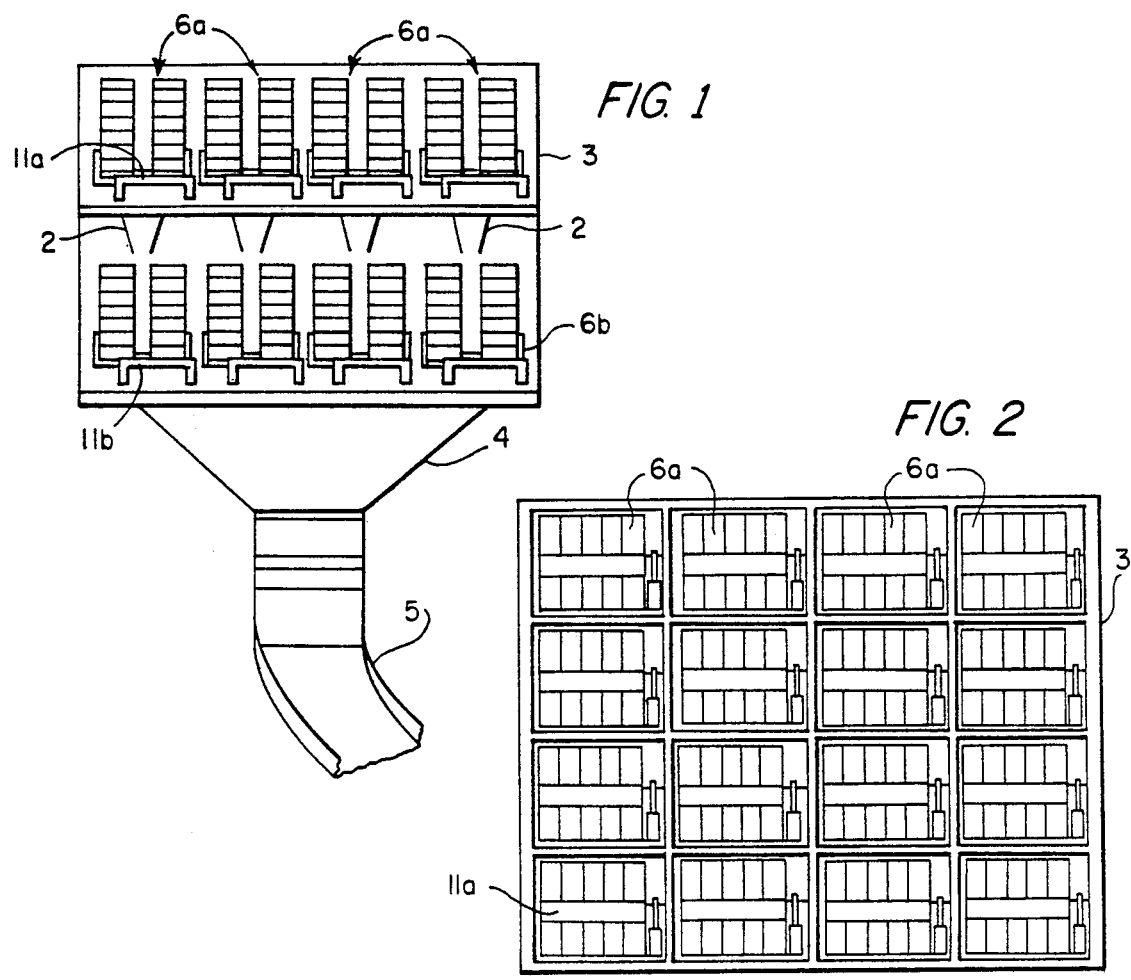
FIG. 1
FIG. 2
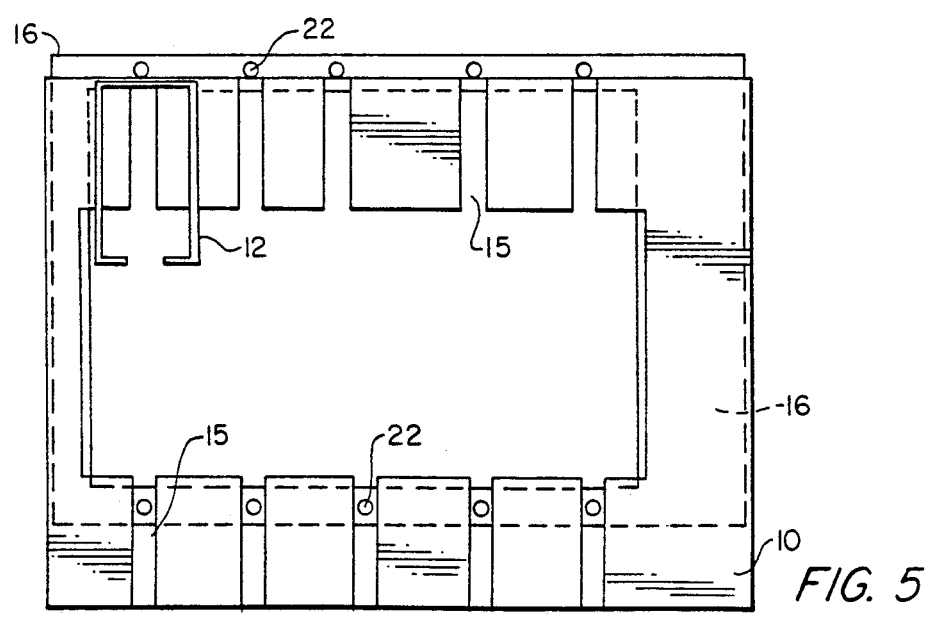
FIG. 5

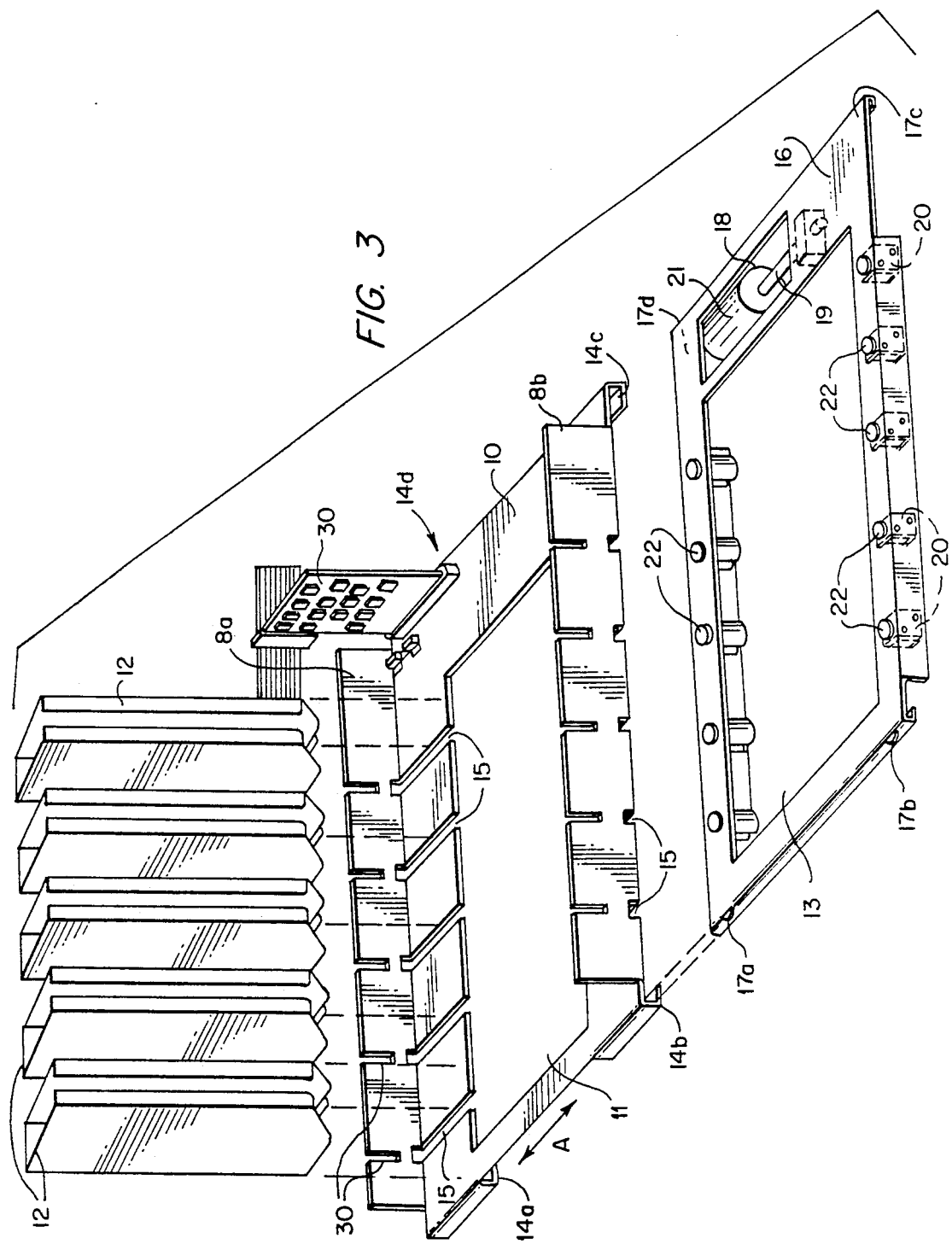

UNIVERSAL DISPENSING APPARATUS FOR STACKED ARTICLES

FIELD OF THE INVENTION

The invention is directed to dispensers and in particular to a dispensing apparatus for efficiently dispensing a plurality of articles which are arranged in stacks and can be of different sizes and shapes.

BACKGROUND OF THE INVENTION

Numerous devices are provided in the prior art for dispensing a plurality of articles. Patented examples include U.S. Pat. No. 4,032,039 (Schuller) and U.S. Pat. No. 3,819,087 (Schuller, et al). The Schuller '039 patent provides an article dispensing apparatus wherein two banks of article dispensers feed to a common drop space in a housing. Each bank comprises a plurality of dispensers arranged in stacked relationship, the dispensers serving to feed articles to the common space. The Schuller et al '087 patent provides an article dispensing apparatus comprising a plurality of banks of columns adapted to contain stacks of cigarette packs to be vended. The lowermost pack of the stack of each column is ejected by a carriage movable beneath the banks and carrying a plurality of ejectors.

SUMMARY OF THE INVENTION

In accordance with the invention, a dispensing apparatus is provided for efficiently dispensing a plurality of articles, such as cigarette packs and cartons. The apparatus comprises a plurality of dispensing modules each including a horizontally extending support plate having an open center at least as large as the largest of the articles to be dispensed, a plurality of generally vertical stack holders disposed on the support plate each holding a stack of the articles, and dispensing means for selectively withdrawing articles from the stack holders and conveying a withdrawn article to the open center of the support plate such that the article drops through the open centers of the support plate for subsequent conveyance to a final destination.

In accordance with a preferred embodiment, a plurality of article holders are arranged in a row on at least one side of the support plate. The article holders comprise replaceable modules open at the top to permit the filling thereof and open at the bottom to enable an article to be withdrawn therefrom.

The dispensing means preferably comprises a shuttle plate disposed below, and parallel to the support plate, wherein the shuttle plate has an open center at least as large as the largest of the articles, shuttle plate movement means for moving the shuttle plate in a plane parallel to the support plate, and engagement means on the shuttle plate for engaging the articles in the stack holders. The engagement means advantageously comprises a drive arm connected to the support plate and solenoid means connecting the shuttle plate to the support plate for extending and retracting the drive arm to provide movement of the shuttle plate laterally, i.e., back and forth.

Preferably the support plate further includes a plurality of slots extending in parallel outward from the open center of the support plate and the engagement means further comprises a plurality of selectively activated, projectable pins each associated with a solenoid or other activator for, when activated, projecting upward from the shuttle plate through the slots of the support plate to engage the articles in the stack holders.

The dispensing apparatus preferably comprises a plurality of dispensing modules arranged on a plurality of levels such that the open centers of modules on different levels are aligned. Thus, articles dispensed from upper level modules fall through the corresponding open center of a lower level modules.

As will appear, the invention provides an efficient and compact system for dispensing a wide variety of individual items. In this latter regard, in an exemplary embodiment, 320 articles of different brands can be dispensed.

Other features and advantages of the invention will be set further in, or be readily apparent from the detailed description of the preferred embodiments which follows.

BRIEF DESCRIPTION OF THE DRAWINGS

FIG. 1 is a side elevational view of a dispensing apparatus in accordance with a preferred embodiment of the invention.

FIG. 2 is a top plan view of the embodiment of FIG. 1.

FIG. 3 is an exploded perspective view of one dispensing module of the embodiment of FIG. 1.

FIG. 5 is a plan view of the dispensing module of FIG. 3.

DETAILED DESCRIPTION OF THE PREFERRED EMBODIMENT

Figure 4:
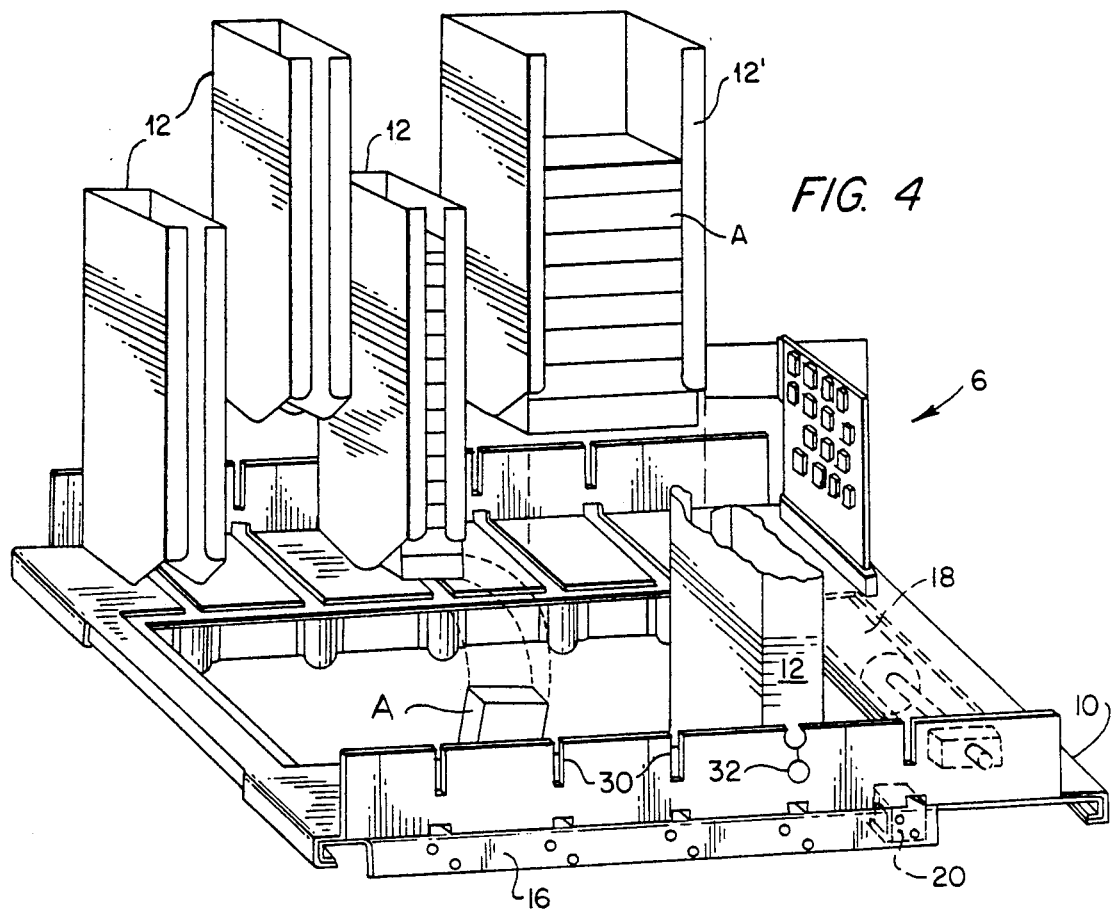
FIG. 4 is a partially exploded, partially assembly perspective exploded view of one dispensing module similar to that of FIG. 1 but employing a stack holder corresponding to an alternative embodiment of the invention.

Referring to FIGS. 1-6, a preferred embodiment of the present invention will now be described. The dispensing apparatus includes a box-shaped frame or housing 3 for enclosing and supporting upper and lower groups of individual dispensing modules which are, as shown in FIG. 1, generally denoted 6a and 6b, respectively. Each individual dispensing module 6a and 6b is capable of dispensing a plurality of articles through a corresponding center opening 11a or 11b formed in the bottom of the corresponding module is explained below.

Considering the two levels of dispensing modules are provided within frame 3, in an exemplary embodiment, sixteen top level modules 6a and sixteen bottom level modules 6b are provided in stacked relation, with FIG. 2 showing the manner in which the sixteen modules 6a of the top level are arranged in a 4×4 pattern or array.

As illustrated in FIG. 1, the upper or top level modules 6a and the lower or bottom level modules 6b are aligned, i.e., offset such that the center openings 11b of bottom level modules 6b are directly below the center openings 11a of the top level modules 6a. Therefore, articles dispensed from a top level module 6a fall through the center opening of the corresponding bottom level module 6b.

Each upper level module 6a further includes a guide or director assembly generally denoted 2 including a pair of angled plates positioned to direct articles (dispensed from a top level module 6a) to the center of the corresponding bottom level module 6b. After falling through the center opening of a bottom level module 6a, an article is further directed by a funnel 4 disposed below bottom modules 6b to a chute 5 positioned below chute 4.

Different devices such as, for example, a conveyor belt, (not shown) can be employed to convey the article from the bottom of chute 5 to a final destination (not shown). Preferably, chute 5 is so constructed as to insure that dispensed articles gravitate toward the bottom of chute 5. For instance, an air cushion (not shown) or a low friction coating (not shown) can be employed to assist the travel of the articles down chute 5. In addition, a vibration device (not shown) can be provided for vibrating chute 5 to thereby reduce friction between a dispensed article and the surface of chute 5.

The dispensing apparatus can be floor or ceiling mounted according to the needs of the user with conventional conveyor methods being used to provide further item movement and distribution.

The dispenser modules 6a and 6b are generally the same and, the construction of a typical representative module is shown in FIGS. 3-5, and is simply denoted 6 in these figures. Module 6 comprises a horizontal generally rectangular support plate 10 having an open center or central opening 11 corresponding to openings 11a and 11b discussed above. The open center 11 is likewise rectangular and is defined by outwardly extending edges of support plate 10. Brace members 8a and 8b extend vertically along opposing exterior edges of support plate 10 as shown. Engagement slots, generally denoted 15, extend outwardly in parallel from open center 11 to the bottom of braces 8a and 8b. Vertical slots, generally denoted 30, extend in parallel from a position slightly above the bottom edges of braces 8a and 8b to the top edges of braces 8a and 8b.

A plurality of generally vertical stack holders, denoted 12, are disposed along both sides of open center 11 on support plate 10 for holding stacks of articles, with one vertical stack holder 12 corresponding to each slot 15. In an exemplary embodiment, five stack holders are provided on each side of open center 11, although for purposes of clarity, only the five stack holders on one side of plate 10 are shown in FIG. 3, i.e., the five stack holders on the other side of plate 10 have been omitted from FIG. 3. Each vertical stack holder 12 has a generally rectangular cross section matched to the shape of articles to be dispensed. In the exemplary embodiment shown in FIG. 3, the stack holders are adapted to hold standard size cigarette packs. It will be appreciated that, in general, the stack holders 12 can hold articles of any size or shape and in an alternative embodiment shown in FIG. 4, one of the stack holders, denoted 12', is adapted to hold a package larger than a cigarette pack such as a film or cosmetic package. As is also shown in FIG. 4, each stack holder 12 includes a pair of vertically spaced headed projections 32 for engaging a corresponding vertical slot 30 such that stack holders 12 are, in use, secured to support plate 10 by the engagement between projections 32 and slots 30.

Figure 6:
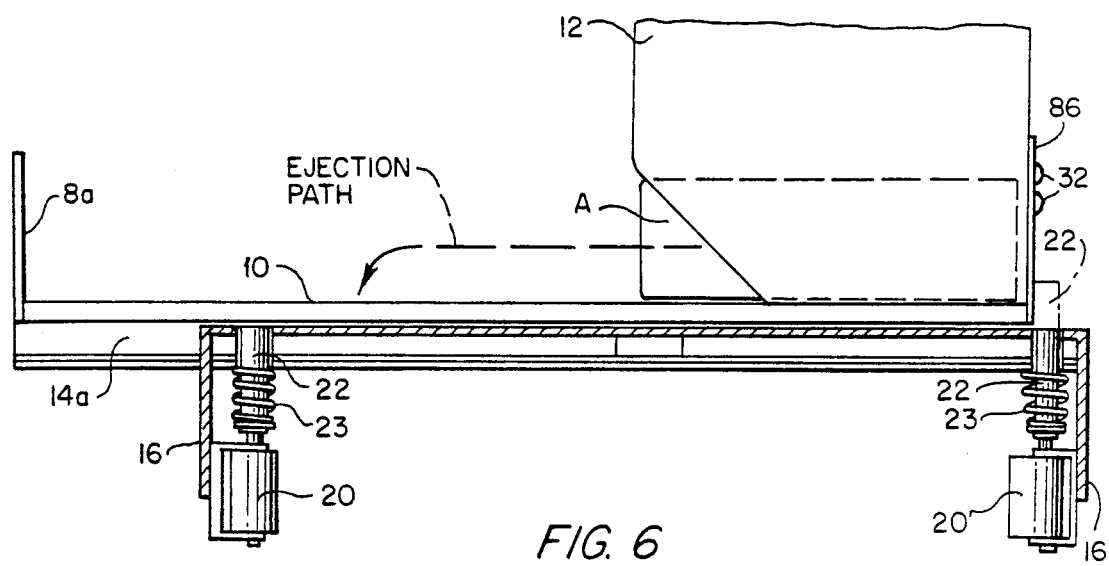
FIG. 6 is a side view of the dispensing module of FIG. 3 with an alternative embodiment of the engagement pins.

Returning to FIG. 3, support plate 10 further includes two rows of lower, inwardly turned rims 14a, 14b and 14c, 14d which are formed in, and depend from two opposing edges of the support plate. A shuttle plate 16 is disposed below, and parallel to, support plate 10 such that opposing edges of shuttle plate 16 are supported and secured by depending rims 14a-14d. Shuttle plate 16 further includes spaced pairs of low-friction engagement members 17a, 17b and 17c, 17d for engaging the interior side surfaces of rims 14a, 14b and 14c, 14d, respectfully. With this arrangement, shuttle plate 16 is capable of back and forth movement in a plane parallel to, and immediately below, support plate 10 as shown by doubled headed arrow A of FIG. 3. Shuttle plate 16 is shorter than support plate 10 in the direction of motion of shuttle plate 16 such that shuttle plate 16 moves laterally with respect to support plate 10 without projecting substantially beyond the edges of support plate 10 as shown in FIGS. 5 and 6.

Shuttle plate 16 further includes a rectangular open center or central opening 13 defined by inwardly extending edges of shuttle plate 16. The size of center opening 13 is sufficiently large such that open center 11 of support plate 10 is not obstructed by shuttle plate 16 as shuttle plate 16 moves back and forth beneath support plate 10.

A drive unit or mechanism 18, connected to the underside of shuttle plate 16 and supported by the underside of support plate 10, is provided for moving shuttle plate 16 with respect to support plate 10. Drive unit 18 can comprise any conventional mechanism for imparting back and forth motion and in the illustrated embodiment comprises an electric linear actuator 21 comprising a conventional motor and ball screw assembly which controls extension and contraction of a drive arm 19 connected to shuttle plate 16. Alternatively, linear actuator 21 can be pneumatic or hydraulic rather than electric.

A plurality of engagement actuators, generally denoted 20, are provided on shuttle plate 16 with one engagement actuator corresponding to each vertical stack 12. As is shown most clearly in FIG. 6, each engagement actuator 20 controls movement of a corresponding engagement pin 22 which is normally biased by a spring 23 into the inoperative position thereof and which, in the operative or actuated position thereof, i.e., when actuated by actuator 20, protrudes, as shown in dashed lines in FIG. 6, vertically through a corresponding engagement slot 15 (FIG. 3). Engagement actuator 20 can comprise any conventional mechanism, such as a solenoid, for controlling protruding and retracting of pin 22. It will be noted that the engagement or extractor pins 22 are positioned somewhat differently in FIG. 3 and FIG. 6. The important consideration regarding the placement of pins 22 is that they be positioned just behind, i.e., out of the way of, the article so that there is no interference with the pin movement when the pin 22 is in the "up" position.

In operation, drive unit 18 moves shuttle plate 16 laterally such that engagement pin 22 lies directly below and to the outside of the outside edge of an article A to be dispensed held at the bottom of a stack holder 12 as shown in FIG. 6. When activated, the corresponding engagement actuator 20 causes engagement pin 22 to protrude vertically, as shown in dashed lines in FIG. 6, and engage the outside edge of the lowest article within vertical support stack 12. Drive 18 then moves shuttle plate 16 toward the center of support plate 10. As shuttle plate 10 moves laterally, engagement pin 22 draws the article A along with shuttle plate 10 so that the article A follows the ejection path shown in FIG. 6. In this manner, the article A is drawn from vertical stack 12, and then drops through open center 11 and open center 13. For a large article, such as a cigarette carton, all engagement pins 22 located adjacent to the article would be activated to simultaneously engage the article such that, as shuttle plate 10 moves laterally, the article is reliably dispensed. The use of several adjacent engagement pins 22 in providing movement of a large article prevents the article from becoming jammed in vertical support stack 12. Also, several different articles can be dispensed at one time by simultaneously activating the corresponding engagement pins 22. Of course, this assumes that the articles to be simultaneously dispensed are not disposed on opposing sides of module 6.

Each dispensing module 6 is electronically controlled via a micro-processor control (shown schematically at 30 in FIG. 1) for selection and dispensing. The selection of a particular item is accomplished by a conventional means such as a keyboard, a keypad, touch panel, or bar code input (not shown). Controller 30 determines the required engagement pin 22 corresponding to a user selected article and executes the selection thereof. Microprocessor control 30 is of conventional design and the selection process is straight-forward. In addition to controlling the selection of articles, microprocessor control 30 can also maintain accounting information concerning the numbers and types of articles previously dispensed.

In an alternative embodiment (not shown), sensors are provided in each module 6 to determine inventory, verify item ejection, sense items remaining in a stack or provide any other information necessary to efficiently monitor the inventory and performance of the dispensing apparatus.

As shown in FIGS. 4 and 6, stack holders 12 are removable and replaceable on support plate 10 by the projections 32 received in vertical slots 23. In use, as the contents of the stack holders are dispensed, stack holders 12 are removed and replaced with refilled stack holders.

Although the invention has been described with respect to exemplary embodiments thereof, it will be understood by those skilled in the art that variations and modifications can be effected in these exemplary embodiments without departing from the scope and spirit of the invention.

I claim:

1. A dispensing module for dispensing a plurality of articles, said module comprising:
   a generally horizontally extending support plate having a central opening at least as large as the largest of the articles to be dispensed,
   a plurality of generally vertically extending article holders disposed on said support plate for holding a stack of said articles such that the lowermost articles of the stack are supported by a support portion of the support, and
   dispensing means for selectively withdrawing articles from said article holders and for conveying articles withdrawn from said article holder relative to said support plate such that a withdrawn article drops through said central opening of said support plate to thereby be dispensed, said dispensing means comprising a shuttle plate disposed below, and parallel to, said support plate and having a central opening therein at least as large as the largest of said articles, shuttle plate movement means for moving said shuttle plate in a plane generally parallel with said support plate, and engagement means on said shuttle plate for selectively engaging said articles in said stack holders such that movement of said shuttle plate by said movement means causes an article engaged by said engagement means to be conveyed from said support portion of said support plate to said central opening of said support plate for dispensing therethrough.

2. The dispensing module of claim 1, wherein said article holders are disposed on opposite sides of said support plate.

3. The dispensing module of claim 2, wherein a plurality of said article holders are arranged in a row on at least one side of said support plate.

4. The dispensing module of claim 1, wherein said article holders comprise replaceable modules open at the top to permit filling thereof and open at the bottom to enable an article to be withdrawn therefrom.

5. The dispensing module of claim 1, wherein said support portion of said support plate includes a plurality of slots extending in parallel from said central opening of said support plate, and
   said engagement means comprises a plurality of selectively movable pins each of which when moved to operation position thereof, projects upwardly from said shuttle plate through a said slot of said support plate to engage a said article in a said stack holder.

6. The dispensing module of claim 5, wherein said engagement means further comprises solenoid means connected to said pins for, when activated, causing said pins to project upwardly from said shuttle plate.

7. The dispensing module of claim 1, wherein said movement means comprises an electric linear actuator means, mounted on said support plate and including a drive arm connected to said shuttle plate, for extending and retracting said drive arm to thereby move said shuttle plate back and forth beneath said support plate.

8. A dispensing module for dispensing a plurality of articles comprising:
   a plurality of generally vertical stack holders for holding a plurality of articles to be dispensed in stacks;
   a support plate for supporting said stack holders and including a support portion for supporting the lowermost articles of the stacks of articles and a central opening at least as large as the largest of the articles to be dispensed; and
   dispensing means for selectively withdrawing said articles one at time from said stack holders, said dispensing means comprising:
   a shuttle plate disposed below said vertical stacks and having a central opening at least as large as the largest of said articles,
   shuttle plate movement means for moving said shuttle plate in a plane below said support plate,
   and engagement means on said shuttle plate for selectively engaging a said lowermost article in a stack holder and conveying an engaged article to said central opening of said support plate such that said engaged article drops through the central openings in said support plate and said shuttle plate.

9. The dispensing module of claim 8, wherein support plate includes a plurality of slots therein and said engagement means further comprises a like plurality of selectively movable pins each of which, when moved to the operative position thereof, projects upwardly from said shuttle plate through a said slot to engage a said article held in a said stack holder.

10. A dispensing apparatus for articles, said apparatus comprising a plurality of dispensing modules, and each of said dispensing module comprising: a generally horizontal support plate having a central opening at least as large as the largest of said articles; a plurality of generally vertical stack holders disposed on said support plate for holding a stack of said articles, dispensing means for withdrawing articles from said stack holders and conveying articles withdrawn from said stack holders to said central opening of said support plate such that the withdrawn articles drop through said opening of said support plate to thereby be dispensed;

said plurality of said dispensing modules being disposed in stacked spaced relation to form at least a top level and a bottom level of said modules, and the central openings of the support plates of the modules of said top level being positioned directly above the central openings of the support plates of the modules of said bottom level such that articles dispensed form the top level modules fall through said central openings of the bottom level modules.

11. The dispensing apparatus of claim 10, wherein said dispensing means comprises a shuttle plate disposed below, and parallel to, said support plate and having a central opening at least as large as the largest of said articles, shuttle plate movement means for moving said shuttle plate in a plane generally parallel with said support plate, and engagement means on said shuttle plate for selectively engaging articles held by said stack holders.

12. The dispensing apparatus of claim 11, wherein said supporting plate further includes a plurality of slots extending in parallel from said central opening of said support plate and said engagement means further comprises a plurality of selectively movable pins each of which, when moved to the operative position thereof, projects upwardly from said shuttle plate through said slots of said support plate to engage a said article in held by a said stack holder.

* * * * *